(12) United States Patent
Russi et al.

(10) Patent No.: US 9,667,947 B2
(45) Date of Patent: May 30, 2017

(54) STEREOSCOPIC 3-D PRESENTATION FOR AIR TRAFFIC CONTROL DIGITAL RADAR DISPLAYS

(71) Applicant: The United States of America, as represented by the Secretary of the Air Force, Washington, DC (US)

(72) Inventors: Jason G Russi, Beavercreek, OH (US); Brent T Langhals, Union, KY (US); Michael E Miller, Xenia, OH (US); Eric L Heft, Kettering, OH (US)

(73) Assignee: The United States of America represented by the Secretary of the Air Force, Washington, DC (US)

( * ) Notice: Subject to any disclaimer, the term of this patent is extended or adjusted under 35 U.S.C. 154(b) by 330 days.

(21) Appl. No.: 14/186,040

(22) Filed: Feb. 21, 2014

(65) Prior Publication Data

US 2014/0306950 A1  Oct. 16, 2014

Related U.S. Application Data

(60) Provisional application No. 61/768,573, filed on Feb. 25, 2013.

(51) Int. Cl.
| | | |
|---|---|---|
| *H04N 13/04* | (2006.01) | |
| *G01S 13/93* | (2006.01) | |
| *H04N 13/00* | (2006.01) | |

(52) U.S. Cl.
CPC ......... *H04N 13/04* (2013.01); *G01S 13/9303* (2013.01); *H04N 13/0402* (2013.01); *H04N 13/0434* (2013.01); *H04N 2013/0081* (2013.01)

(58) Field of Classification Search
CPC ......... G06T 19/00; G06T 17/20; G06T 17/00; G06T 15/10; G06T 15/00; G06T 7/0051; H04N 13/04; G02B 27/22

(Continued)

(56) References Cited

U.S. PATENT DOCUMENTS

| | | | |
|---|---|---|---|
| 5,227,786 A | 7/1993 | Hancock | |
| 5,374,932 A * | 12/1994 | Wyschogrod | G08G 5/065 342/29 |

(Continued)

FOREIGN PATENT DOCUMENTS

| | | |
|---|---|---|
| EP | 0405430 B1 | 4/1995 |
| EP | 1450331 A1 | 8/2004 |

OTHER PUBLICATIONS

"DFS tests 3D Air Traffic Control Workstation that uses Christie Projectors", http://www.christiedigital.com/en-us/3d/3d-and-advanced%20visualization-case-studies/3d-and-advanced-visualization-projector-installations/Pages/3d-air-traffic-control-workstation.aspx.

(Continued)

*Primary Examiner* — Maurice L McDowell, Jr.
(74) *Attorney, Agent, or Firm* — AFMCLO/JAZ; Charles Figer, Jr.

(57) ABSTRACT

An apparatus and method of presenting air traffic data to an air traffic controller are provided. Air traffic data including a two dimensional spatial location and altitude for a plurality of aircraft is received. A disparity value is determined based on the altitude for each aircraft of the plurality of aircraft. Left and right eye images are generated of the plurality of aircraft where at least one of the left and right eye images is based on the determined disparity value. The left and right eye images are simultaneously displayed to the air traffic controller on a display. The simultaneously displayed images provide an apparent three-dimensional separation of each of the aircraft of the plurality of aircraft on the display.

20 Claims, 10 Drawing Sheets

(58) Field of Classification Search
USPC .......................................................... 345/419
See application file for complete search history.

(56) References Cited

U.S. PATENT DOCUMENTS

| | | | |
|---|---|---|---|
| 5,530,420 A * | 6/1996 | Tsuchiya | G01S 11/12 |
| | | | 180/167 |
| 5,732,384 A | 3/1998 | Ellert et al. | |
| 7,203,596 B2 | 4/2007 | Ledingham et al. | |
| 7,755,516 B2 | 7/2010 | Clark et al. | |
| 7,791,805 B2 | 9/2010 | Yokosawa | |
| 8,255,147 B2 | 8/2012 | Roberts et al. | |
| 2011/0298900 A1 * | 12/2011 | Inaba | H04N 13/0438 |
| | | | 348/47 |
| 2012/0038631 A1 * | 2/2012 | Mayhew | G06F 3/04815 |
| | | | 345/419 |
| 2013/0033588 A1 * | 2/2013 | Shiomi | G02B 27/26 |
| | | | 348/58 |
| 2014/0063018 A1 * | 3/2014 | Takeshita | G06T 7/0051 |
| | | | 345/427 |

OTHER PUBLICATIONS

Doukat et al., "Matching Technique of Objects in Radars With Stereoscopic Vision", Journal of Microwaves and Optoelectronics, vol. 2, No. 3, pp. 46-56 (Jul. 2001).

* cited by examiner

STEREOSCOPIC 3-D PRESENTATION FOR AIR TRAFFIC CONTROL DIGITAL RADAR DISPLAYS

CROSS-REFERENCE TO RELATED APPLICATIONS

This application claims the benefit of and priority to U.S. Provisional Application Ser. No. 61/768,573, entitled "Stereoscopic 3-D Presentation for Air Traffic Control Digital Radar Displays," filed on Feb. 25, 2013, the entirety of which is incorporated by reference herein.

RIGHTS OF THE GOVERNMENT

The invention described herein may be manufactured and used by or for the Government of the United States for all governmental purposes without the payment of any royalty.

BACKGROUND OF THE INVENTION

Field of the Invention

The present invention generally relates to Air Traffic Control and, more particularly, visualizing air traffic.

Description of the Related Art

Air traffic control (ATC) is a service provided by ground-based controllers who direct aircraft on the ground and through controlled airspace. The primary purpose of ATC systems worldwide is to separate aircraft to prevent collisions (referred to as separation), to organize and expedite the flow of traffic, and to provide information and other support for pilots when able.

In many countries, ATC services are provided throughout the majority of airspace, and its services are available to all users (private, military, and commercial). When controllers are responsible for separating some or all aircraft, such airspace is called "controlled airspace" in contrast to "uncontrolled airspace" where aircraft may fly without the use of the air traffic control system. Depending on the type of flight and the class of airspace, ATC may issue instructions that pilots are required to follow, or merely flight information (in some countries known as advisories) to assist pilots operating in the airspace.

Air traffic controllers are people trained to maintain the safe, orderly and expeditious flow of air traffic in the global air traffic control system. The position of air traffic controller is one that requires highly specialized knowledge, skills, and abilities. Controllers apply separation rules to keep aircraft at a safe distance from and between other aircraft, terrain, and obstructions in their area of responsibility and move all aircraft safely and efficiently through their assigned sector of airspace, as well as on the ground. The multiple criteria of safety and expeditiousness often conflict, presenting the air traffic controller with difficult decisions. Specifically, while the air traffic controller may wish to maintain a large separation between aircraft to enable safe flight, the need to move large numbers of aircraft through a constrained air space requires a high aircraft density. Further, while the air traffic controller may wish to redirect aircraft which have a potential conflict, these redirects cause the aircraft to maneuver, requiring more fuel and disrupting prior planning, potentially causing a ripple effect as the redirected aircraft becomes more likely to enter the path of another aircraft. Because controllers have an incredibly large responsibility while on duty and make countless split-second decisions on a daily basis, the ATC profession is consistently regarded around the world as one of the most mentally challenging careers, and can be notoriously stressful depending on many variables including equipment, configurations, weather, traffic volume, human factors, etc.

Air traffic controllers are responsible for the safety of aircraft at higher altitudes, in the en route phase of their flight. In most nations they are known as "area" or "en route" controllers. Area controllers are responsible for specific sectors of three dimensional blocks of airspace with defined dimensions. Each sector is managed by at least one Area controller. This can be done with or without the use of radar, though radar allows a sector to handle much more traffic. FIGS. 1 and 1A illustrate a contemporary ATC radar display 10 which may be used by an Area controller. Despite years of effort and billions of dollars spent on computer software designed to assist air traffic control, success has been largely limited to improving the tools at the disposal of the controllers, such as computer-enhanced digital radar. Domestic and international airspace has become increasingly more congested through an increase in traffic volume as illustrated in the exemplary ATC display 12 in FIG. 2. These congested two dimensional displays require the air traffic controller to perform constant mental calculations to determine vertical spacing as the two dimensional displays indicate aircraft altitude only through textual annotation and the air traffic controller must subtract the altitude of one aircraft from another aircraft to determine vertical separation. These calculations involve labor intensive mental processes which are fatiguing and task the situational awareness of the controllers. Additionally, on-screen data clutter reduces situational awareness and task vigilance and also adds to workload rather than reducing it.

Accordingly, there is a need in the art for a method of better visualizing and managing air traffic data.

SUMMARY OF THE INVENTION

Embodiments of the invention provide a method and apparatus for presenting air traffic data to an air traffic controller. In some embodiments, the method includes receiving air traffic data including a two dimensional spatial location and altitude for a plurality of aircraft. Then, a disparity value is determined based on the altitude for each aircraft of the plurality of aircraft. Left and right eye images of the plurality of aircraft are generated where at least one of the left and right eye image is based on the determined disparity value. The left and right eye images are simultaneously displayed to the air traffic controller on a display. The simultaneously displayed images provide an apparent three-dimensional separation of each of the aircraft of the plurality of aircraft on the display.

In some embodiments, the method further includes rendering a representation of a reference plane on the display. In some of these embodiments, the left and right eye image of the plurality of aircraft may be generated as a perspective view with respect to the reference plane. Additionally, the reference plane may be rendered including range rings, and the reference plane may be rendered with a near zero disparity. In some embodiment, the apparent three-dimensional separation of each of the aircraft of the plurality of aircraft on the display appears above the reference plane.

In some embodiments, the air traffic data may include a representation of a volume of air space under control. In these embodiments, a disparity value associated with the representation of the volume of air space under control may be determined. Left and right eye images of the representation of the volume of air space under control may then be generated and simultaneously displayed to the air traffic controller on the display. In other embodiments, the air traffic data may include navigation cues such as terrain obstructions, topographical data, minimum safe altitudes, and minimum vectoring altitude. In these embodiments, a disparity value associated with the navigation cues may be determined. Left and right eye images of the navigation cues may then be generated and simultaneously displayed to the air traffic controller on the display. In still other embodiments, a left eye and a right eye image may be generated for a text label for each of the aircraft of the plurality of aircraft based on the determined disparity and simultaneously displayed to the air traffic controller on the display.

Embodiments of the invention also provide an apparatus for presenting air traffic data to an air traffic controller. The apparatus includes a memory, a processor, and a display. Program code is resident in the memory and configured to be executed by the processor to present the air traffic data to the air traffic controller. The program code is further configured to receive air traffic data including a two dimensional spatial location and altitude for a plurality of aircraft, determine a disparity value based on the altitude for each aircraft of the plurality of aircraft, generate left and right eye images of the plurality of aircraft where at least one of the left and right eye image is based on the determined disparity value, and simultaneously display the left and right eye images to the air traffic controller on the display.

Alternate embodiments of the invention additionally provide an apparatus for presenting air traffic data to an air traffic controller that included a first memory associated with a first processor, a second memory associated with a second processor, a third memory associated with a third processor, and a display. A first program code is resident in the first memory and configured to be executed by the first processor. The first program code is further configured to receive air traffic data including a two dimensional spatial location and altitude for a plurality of aircraft, determine a disparity value based on the altitude for each aircraft of the plurality of aircraft, and generate a left eye image of the plurality of aircraft. A second program code is resident in the second memory and configured to be executed by the second processor. The second portion of the program code is further configured to simultaneously receive the air traffic data including the two dimensional spatial location and altitude for the plurality of aircraft, determine the disparity value based on the altitude for each aircraft of the plurality of aircraft, and generate a right eye image of the plurality of aircraft. A third program code is resident in the third memory and configured to be executed by the third processor. The third program code is further configured to receive the left and the right eye images of the plurality of aircraft and simultaneously display the left and right eye images to the air traffic controller on the display.

Additional objects, advantages, and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated in and constitute a part of this specification, illustrate embodiments of the invention and, together with a general description of the invention given above, and the detailed description given below, serve to explain the invention.

It should be understood that the appended drawings are not necessarily to scale, presenting a somewhat simplified representation of various features illustrative of the basic principles of the invention. The specific design features of the sequence of operations as disclosed herein, including, for example, specific dimensions, orientations, locations, and shapes of various illustrated components, will be determined in part by the particular intended application and use environment. Certain features of the illustrated embodiments have been enlarged or distorted relative to others to facilitate visualization and clear understanding. In particular, thin features may be thickened, for example, for clarity or illustration.

DETAILED DESCRIPTION OF THE INVENTION

Figures 1, 1A:
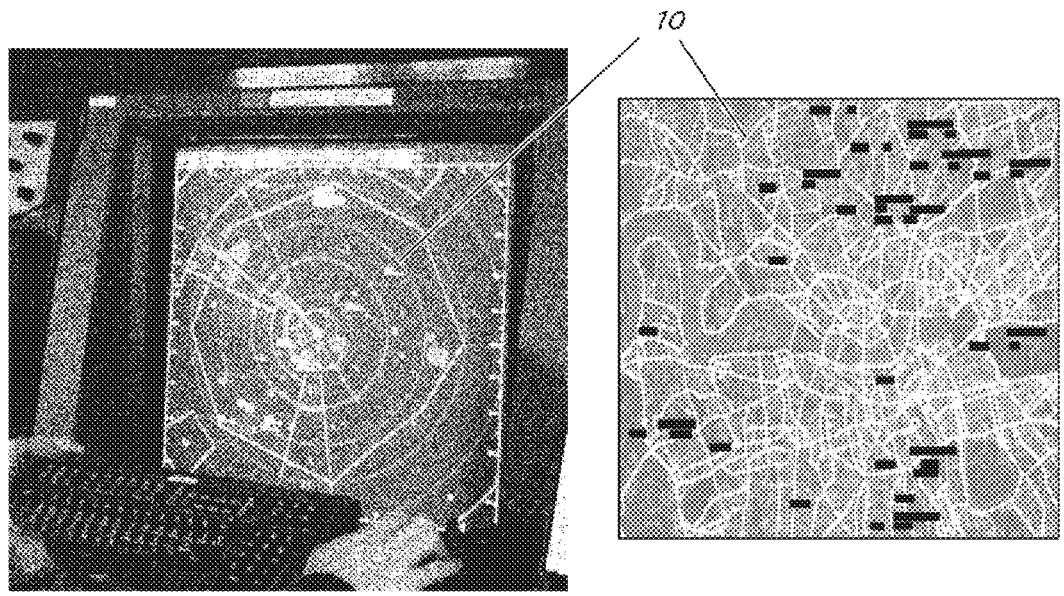
FIG. 1 is a picture of a contemporary air traffic controller radar display.
FIG. 1A is an exemplary view of activity displayed on the display of FIG. 1.
Figure 2:
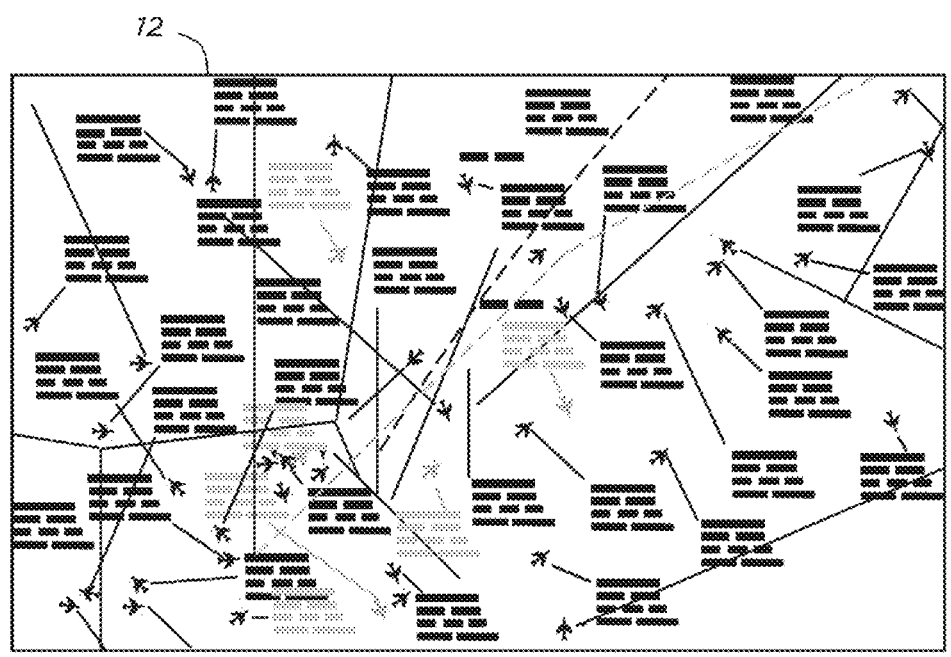
FIG. 2 is an exemplary display of air traffic for a particular area.
Figure 3:
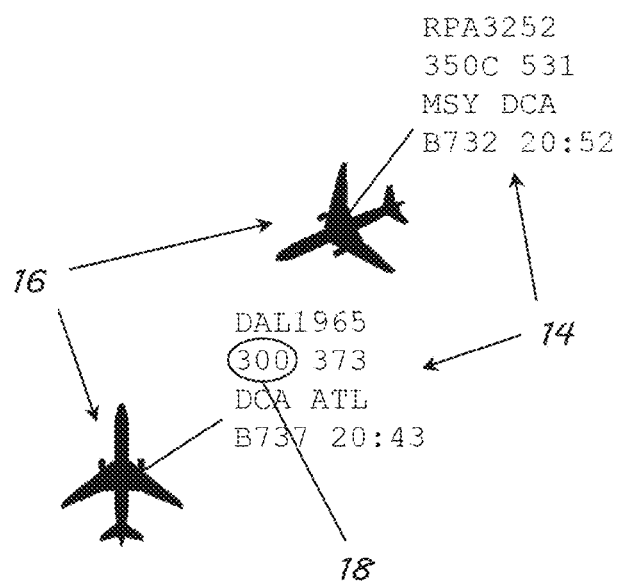
FIG. 3 is a simplified view of air traffic such as the air traffic displayed in FIG. 2.
Figure 4:
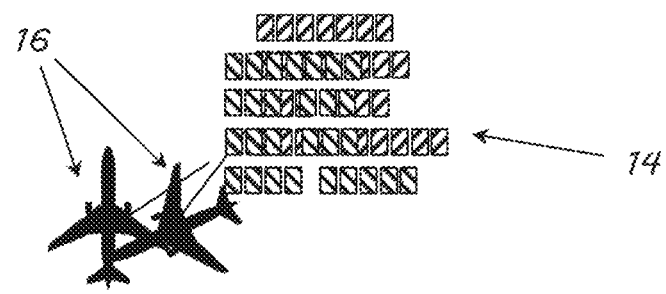
FIG. 4 is the simplified view of FIG. 3 later in time where air traffic has moved.

As air traffic becomes increasingly more congested, managing the safety of air traffic by air traffic controllers is becoming increasingly more challenging as illustrated in the exemplary display 12 in FIG. 2. Aircraft identification, type, altitude, and speed are conventionally displayed in an information block, referred to as a "data tag" associated with each aircraft symbol. Exemplary information blocks 14 and aircraft symbols 16 may be seen in a simplified display in FIG. 3. Contemporary displays provide only a two dimensional view of the aircraft 16 with a vertical indication 3-digit altitude code to represent altitude. For example, reference number 18 shows an altitude code of 300, which indicates that the aircraft is at 30,000 ft altitude. Thus, spatial vertical position and orientation of the aircraft in the 3-D volume of airspace is left to controller's mental image creation, which, with the volume of aircraft in a given sector is mentally tasking and contributes to fatigue as the controller must continually update their mental model based on the dynamic environment. Perhaps even more taxing is the fact that the air traffic controller must view these information blocks for every pair of approaching or neighboring aircraft and subtract the altitude of one aircraft from another to determine their vertical separation. Furthermore, as the aircraft move toward one another, the information blocks 14 may overlap, obscuring information as illustrated in the simplified display in FIG. 4.

Figure 5:
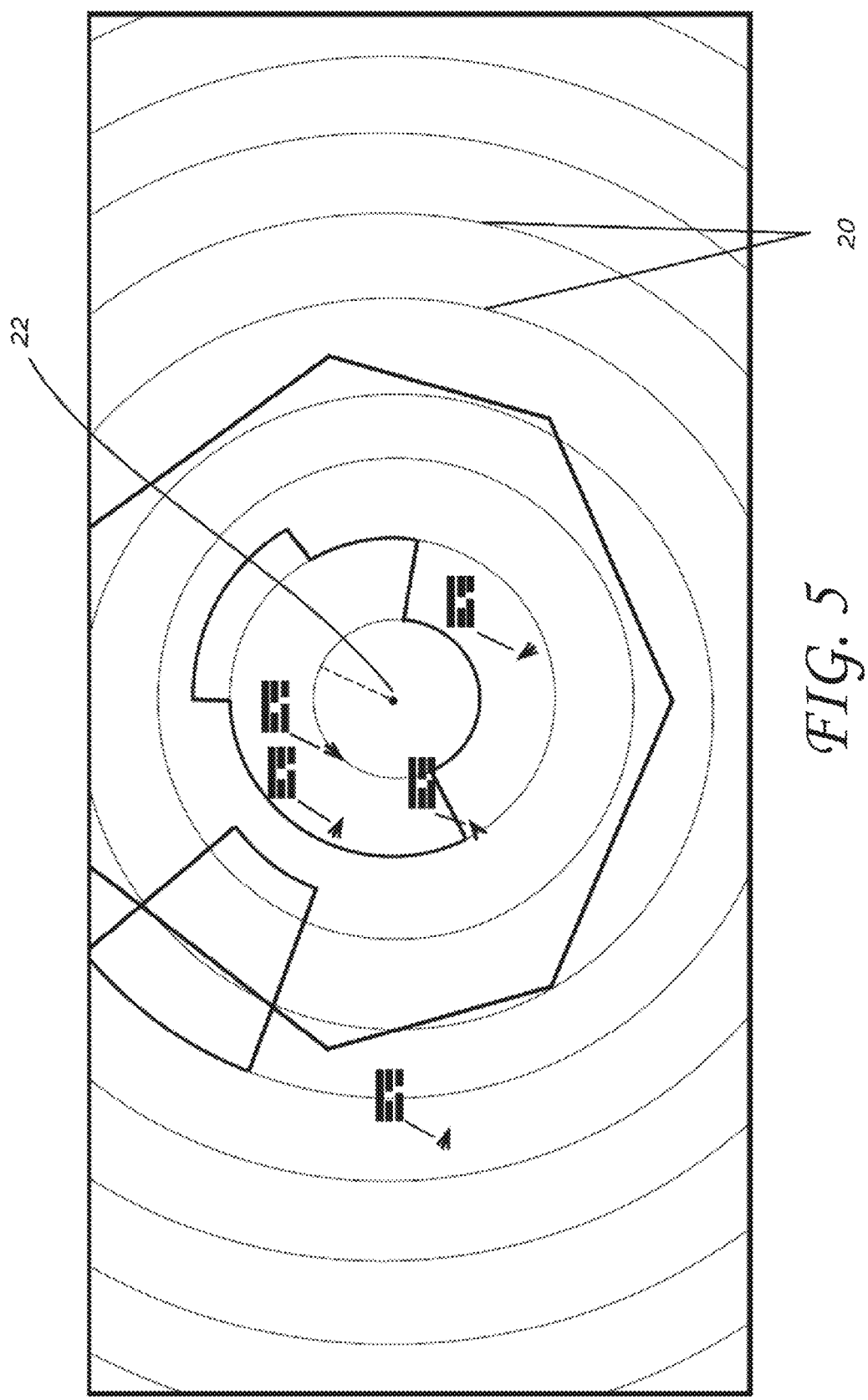
FIG. 5 is another simplified view of air traffic for a particular area.
Figure 6:
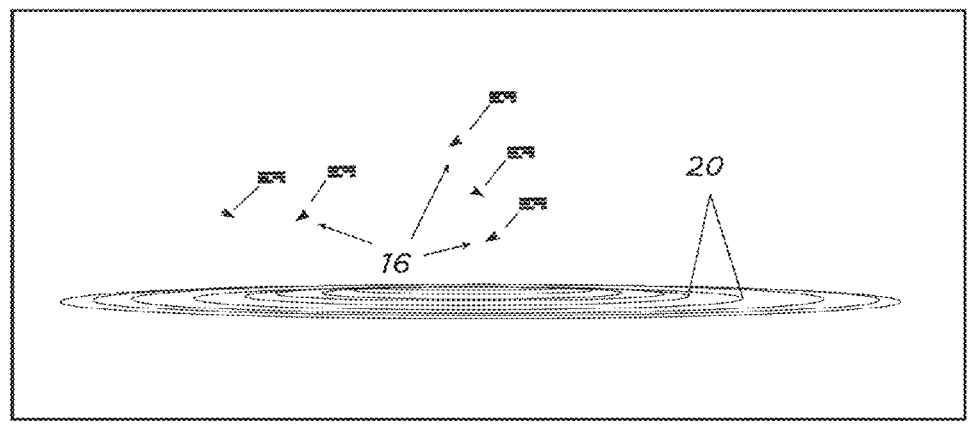
FIG. 6 is a rotated view of the air traffic data in FIG. 5 illustrating the vertical separation of aircraft.
Figure 7:
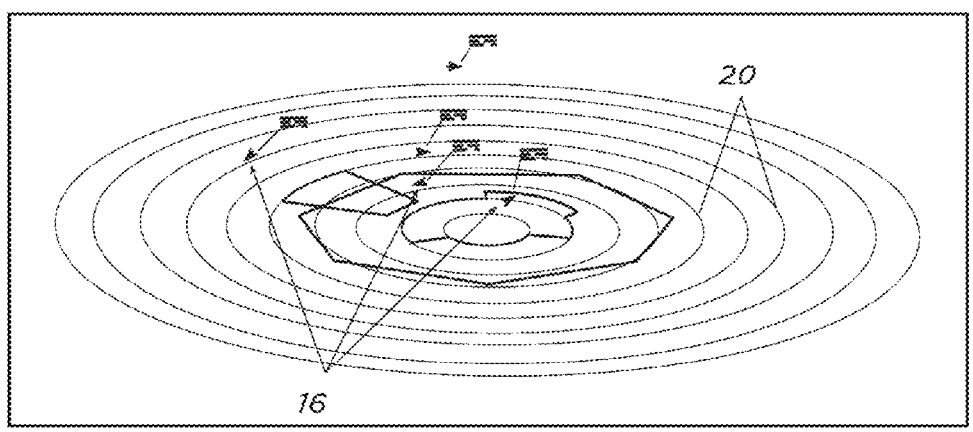
FIG. 7 is an isometric view of the air traffic data in FIG. 5.

FIG. 5 illustrates a simplified air space area of responsibility, which will be used to describe embodiments of the invention below. FIG. 6 illustrates a vertical separation of the aircraft 16 in the area of FIG. 5. One contemporary solution to better visualize the aircraft 16 on a radar display is to view the information isometrically as indicated by the combination of FIG. 5 and FIG. 6 or alternatively at some other rotated view, as illustrated in FIG. 7. The use of isometric views can be beneficial; however, it is often difficult for the controller to associate the aircraft in the two isometric views. While a rotated view assists in visualizing vertical separation of the aircraft 16, it does not provide as accurate of a display of the planar separation of the aircraft as seen in a traditional display as in FIG. 5.

FIG. 5 also illustrates range rings 20, which represent horizontal distance from an airport as represented by the center of the radar scope 22. These rings 20 can be shown or hidden by the air traffic controller during normal operation as the range rings 20 can add clutter to the screen but can also display useful lateral distance reference information for ensuring adequate separation. These rings 20 may be set a varied intervals based upon controller preference and separation needs.

Unlike conventional two dimensional displays, embodiments of the invention use three dimensional displays with the controller viewing the display top down, as with the conventional radar display. Any number of three dimensional displays may be utilized, however the following illustrated embodiment will be described using a stereo display.

The basic technique of stereo displays is to present offset images that are displayed separately to the left and right eye. Both of these two images are then combined, or fused, in the brain to give the perception of three dimensional depth. However, it is recognized in the art that fusion occurs under a restricted set of conditions, which depend on the separation, orientation, size, color, and various other characteristics of objects in the two images. To maximize depth when viewed on a stereo display, it is typical to render objects that should appear at the plane of the display surface such that they appear in the same spatial location on the display. The eyes will converge (i.e., rotate to point at) the object at the plane of the display, permitting the left and right eye image of the object to appear at the center of the human retina. These objects then have no (i.e., zero) disparity in the location of the object as imaged on the left and right retinas of the viewer's two eyes, when the user looks at the object. While the user is looking at this first object, other objects which are to appear behind the display are separated horizontally such that the left and right eye images fall on the nasal side of the retina. This may be achieved by moving the object to be viewed by the left eye to the left and the object to be viewed by the right eye to the right, resulting in "uncrossed" disparity between the images projected on the observer's left and right retinas. In some embodiments, uncrossed disparity may be referred to a negative disparity and may be annotated as having a negative disparity value. Objects, which are to appear in front of the display are separated horizontally, such that the eyes converge to the object at a plane somewhere in front of the display by moving the object to be viewed by the left eye to the right and the object to be viewed by the right eye to the left, resulting in "crossed" disparity between the images projected on the observer's left and right retinas. This disparity may be annotated as having a positive disparity value.

In natural images, objects having significant crossed disparity will often appear to have significant parallax when view with the two eyes. As a result, the two eyes will see distinctly different views of the three dimensional object. For example, the left eye will see the left side of a finger and the right eye will see the right side of the finger when the finger is held close to the nose. Similarly, the images may be rendered with disparity, by rendering offset parallax views of the object, particularly when the object is rendered too close to the observer using crossed or positive disparity.

Rendering conventional digital air traffic control screens to include a large range of crossed and uncrossed disparities may result in significant eye strain and distortion of the perceived images. To assist in reducing the eye strain and distortion, a reference plane may be utilized for comparison with the aircraft on the display, which, for example indicates the ground or surface plane. This reference plane may include a graphic which includes elements that substantially extend across the entire display. This reference plane may be represented various ways, but may be represented through the presentation of range rings 20, such as those illustrated in FIGS. 5-7 at the ground plane. Further, if eye strain and distortion are to be avoided when displaying images of aircraft, similar to those shown in a traditional radar display on a stereo display, each of the two dimensional images should be presented to each eye of the viewer so that the representation of any reference plane should be rendered with near zero disparity, such that the left and right eye images approximately overlap spatially on the display. More specifically, this reference plane should be located so that the left and right eye images have a disparity of less than 0.5 degrees (e.g., between −0.5 and 0.5 degrees of disparity).

To present a stereoscopic picture, two images may be projected superimposed onto the same screen through different polarizing filters. A viewer wears eyeglasses which may also contain a pair of polarizing filters oriented differently (clockwise/counterclockwise with circular polarization or at 90 degree angles, usually 45 and 135 degrees, with linear polarization). As each filter passes only that light which is similarly polarized and blocks the light polarized differently, each eye sees a different image. This may be used to produce a three-dimensional effect by projecting the same scene into both eyes, but depicted from slightly different perspectives. Additionally, since both lenses have the same color, people with one dominant eye (amblyopia), where one eye is used more, are able to see the three dimensional effect, previously negated by the separation of colors used in other stereoscopic methods.

Circular polarization has an advantage over linear polarization, in that the viewer does not need to have their head upright and aligned with the screen for the polarization to work properly. With linear polarization, turning the glasses sideways causes the filters to go out of alignment with the screen filters causing the image to fade and for each eye to see the opposite frame more easily. For circular polarization, the polarizing effect works regardless of how the viewer's head is aligned with the screen such as tilted sideways, or even upside down. The left eye will still only see the image intended for it, and vice versa, with little fading, ghosting or crosstalk.

Alternatively, the eclipse method utilizes a shutter, which blocks light from each appropriate eye when the converse eye's image is projected on the screen. The display alternates between left and right images, and opens and closes the shutters in the glasses or viewer in synchronization with the images on the screen. A variation on the eclipse method is used in LCD shutter glasses. Glasses containing liquid crystal that will let light through in synchronization with the images on the radar screen using the concept of alternate-frame sequencing. A drawback of this method is the need for each person viewing to wear expensive, electronic glasses that must be synchronized with the display system using a wireless signal or attached wire and an infrared emitter that times the frames to the LCD shutter action. The shutter-glasses are heavier than most polarized glasses, though lighter models are no heavier than some sunglasses or deluxe polarized glasses.

In some methods, glasses may not be necessary to see the stereoscopic image. For example, lenticular lens and parallax barrier technologies involve imposing two (or more) images on the same sheet, in narrow, alternating strips, and using a screen that either blocks one of the two images' strips (in the case of parallax barriers) or uses equally narrow lenses to bend the strips of image and make it appear to fill the entire image (in the case of lenticular prints). To produce the stereoscopic effect, a person must be positioned so that one eye sees one of the two images and the other sees the other.

Figure 8:
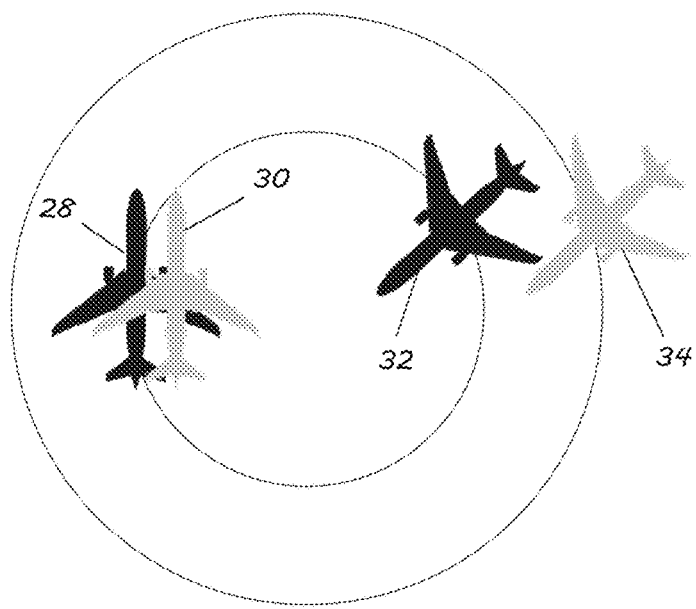
FIG. 8 illustrates a left/right eye separation of aircraft for an exemplary stereoscopic display.
Figure 9:
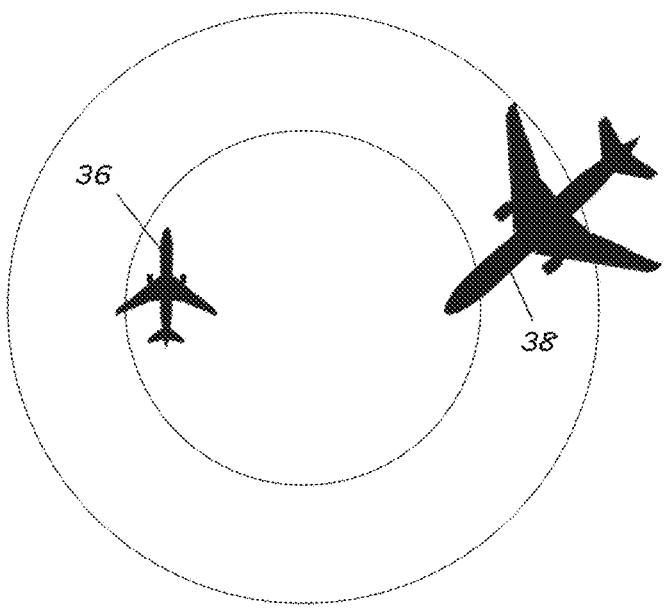
FIG. 9 illustrates a resulting stereoscopic image of FIG. 9.
Figure 10:
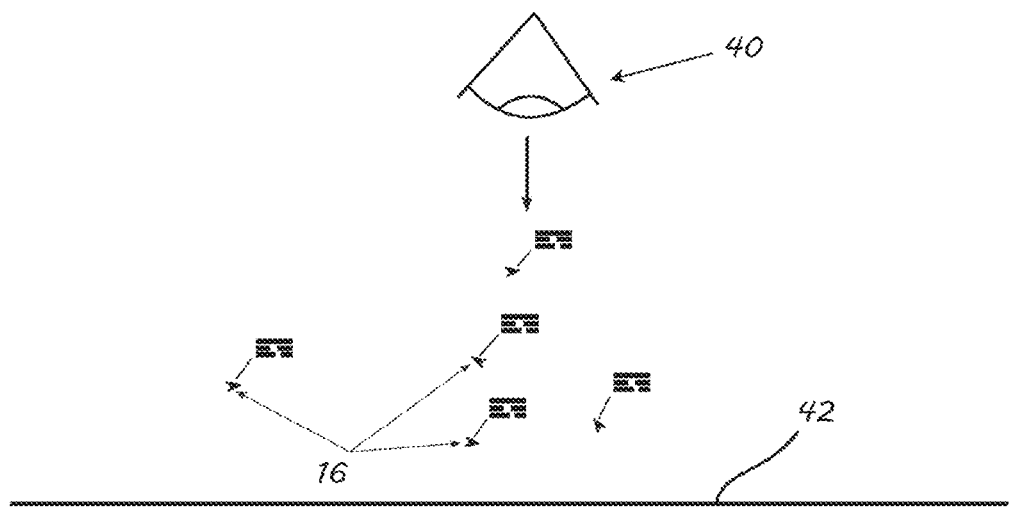
FIG. 10 is a side view of the radar display of FIG. 5 illustrating the top down view of an air traffic controller.
Figure 11:
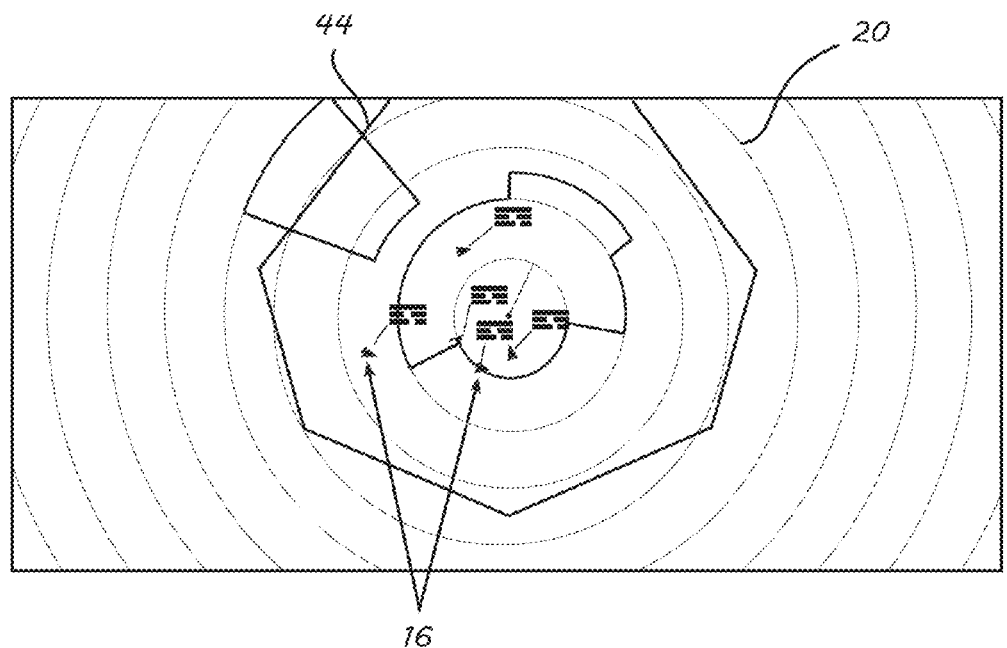
FIG. 11 is a top down view of the radar display of FIG. 5 illustration additional symbols.

Embodiments of the invention may utilize any three-dimensional display method, including any stereoscopic method to present stereoscopic images to provide vertical separation information to the air traffic controller. Dual images (left eye, right eye) 28, 30 and 32, 34 may be generated from ATC radar data as illustrated in FIG. 8. When viewed with a stereoscopic display, aircraft 36 appears to be beneath aircraft 38 as illustrated in FIG. 9. Applying this technique to the simplified area of FIG. 5, FIG. 10 illustrates a side view of the altitude illusion that would be seen 40 by the air traffic controller. In some embodiments, a ground plane 42 may be set to be at the plane of the display with the traditional range rings 20 being positioned at the ground plane 42. Additional markings or indicators 44 such as maps, air routes, air space boundaries, etc. may also be displayed on the ground plane 42, though other embodiments may display these markings or indicators 44 above the ground plane with the aircraft symbols 16 as illustrated in FIG. 11. While it is contemplated that the air traffic controllers will be looking down towards the ground plane 42 in embodiments of the invention, some embodiments may look up from the ground plane. These embodiments may be utilized by personnel in a tower, for example.

The rings 20 may be set at the plane of the display surface or modified to illustrate a vertical ceiling or floor of a controller's airspace jurisdiction. By using the rings 20 as a reference for airspace parameters, or limitations the awareness of an air traffic controller's airspace is more evident. Additionally, the rings 20 may be presented and adjusted in such as a way as to allow for depiction of a minimum safe altitude limit (MSA) or minimum vectoring altitude (MVA), allowing a controller to easily detect when an aircraft has reached or descended below these critical altitudes. Topographical depiction using the rings 20 or simplified mapping may also be possible with modification to display distortions in the reference plane they depict illustrating topography, such as terrain, or even tall obstructions such as communications towers.

Figure 12:
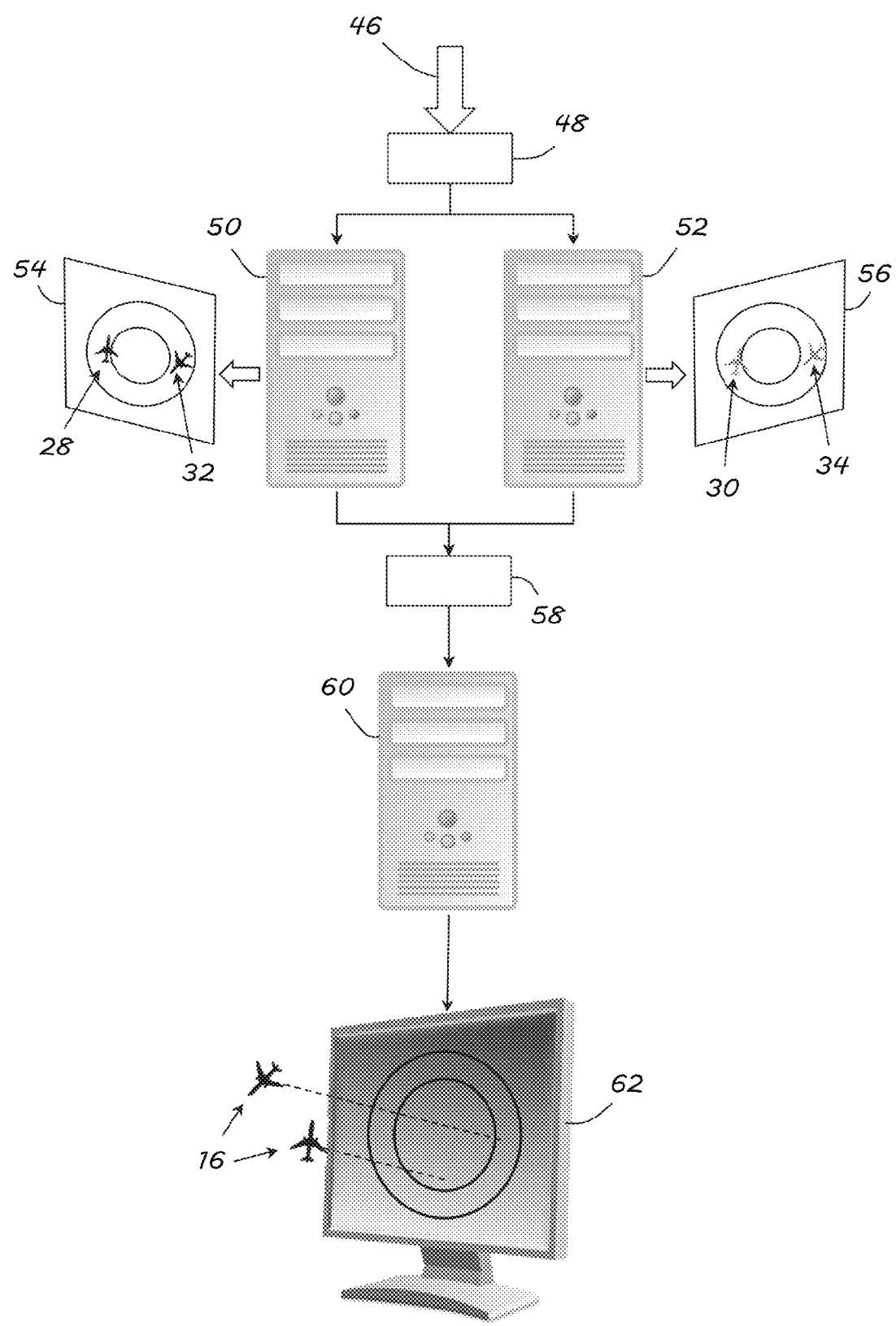
FIG. 12 is an exemplary hardware configuration to generate the stereoscopic views of the air traffic data.

To generate the dual images for stereoscopic visualization, an exemplary hardware environment is illustrated in FIG. 12 and may be utilized by some embodiments of the invention. Air traffic data 46 may be split with a splitter 48 sending the data 46 to both processor 50 and processor 52. The air traffic data 46 may consist of real time digital radar data, GPS data, or other radar feed data in other embodiments which include an altitude and a horizontal location with respect to a known ground reference point. The air traffic data 46 may additionally be simulator data used for training controllers. One or each of the processors 50, 52 may generate a desired disparity value for each aircraft based upon the altitude of that aircraft or additional air traffic data elements. Each of the processors 50, 52 may independently generate images 54, 56 representing the air traffic data 46 which may include a graphical representation of the reference plane and the aircraft to be displayed. The air traffic data 46 might additionally include graphical representations of other items to present a representation of a volume of air space under control and important navigation cues, such as terrain obstructions (e.g., antennas, power lines, mountains, etc), topographical data, or minimum safe altitudes for a certain area (MSA) or minimum vectoring altitude (MVA). In order to generate an aim disparity for the left and right eye images (corresponding to images 54 and 56 respectively), the images may be rotated out of plane. In some embodiments the rotation of each of the images may be approximately 4 degrees with a range of about 2 to about 6 degrees producing the least amount of distortion. Other embodiments using other stereoscopic technology may be able to utilize smaller or larger rotations of the images. The images 54, 56 may then be captured by frame grabbers, for example, and consolidated 58 before being sent to a fusing processor 60, which may then display a fused image on a stereoscopic display 62.

The illustrated embodiment in FIG. 12 utilizes multiple processors to generate the individual images and combine the images to be displayed. Other embodiments may consolidate this process onto a single processor. Additionally, while being processed, a slight time delay may be introduced into real time traffic data 46 due to the generation of the stereoscopic images; however, no more so than is currently seen with modern digital radar returns, which are regenerated every 4.8 seconds based upon radar antennae sweep rate. In some embodiments, the images 54 and 56 may be generated using software provided by the Federal Aviation Administration. This software, SIGNAL (Simulation and Integration of Ground, Network and Air Links), is able to generate three dimensional images of the air traffic data 46 with the ground plane being in the X-Y plane. In the illustrated embodiment, image 54 may be rotated approximately −4 degrees about Y axis and image 56 may be rotated approximate 4 degrees about the Y axis. The generation of the rotated images is synchronized to properly create the stereoscopic image displayed on the stereoscopic display 62. In this example, rotating cameras about a point centered on a ground plane provides a different view of each aircraft for the left and right eye images where the aircraft, which are position above the ground plane, have a positive, crossed disparity. The magnitude of the disparity increases as a function of the altitude of the aircraft. Further, as the SIGNAL software provides three dimensional representations of the aircraft, the aircraft in the two views are rendering having different viewpoints, providing parallax cues in addition to disparity cues to the air traffic controller.

In alternate embodiments, the disparity of the aircraft, rings or other objects may be adjusted by shifting the object in one direction for one eye view or shifting each object in opposing directions by a distance consistent with half of the disparity change. The view of the objects may then be rotated to provide parallax cues that are consistent with the view provided to each eye under normal viewing conditions for the amount of disparity. That is, a transform may be confused between disparity and real world distance for the size of the object. This transform may be linear or a more complex transform, such as a logarithmic function. The difference in angular view of the object may then be calculated to be consistent with the parallax of a real object having the corresponding object size and transformed distance.

In some embodiments, converting each aircraft altitude to an aim disparity value results in at least 40 discrete levels. In these embodiments, aircraft having altitudes varying by 1,000 feet or more between 0 and 40,000 feet may be displayed with a different disparity value. Additionally, the disparity value for the ground plane may be kept within greater than approximately −0.5 degrees of visual angle and less than approximately 0.5 degrees of visual angle when viewed on a target visual display from a viewing distance of 3 picture heights. Other embodiments may render the top-down depiction of each aircraft such that a perspective view of each left and right eye view of each aircraft is seen as a perspective view with respect to the ground plane.

Additional user controls for the display may allow an air traffic controller to set a user preference to convert each aircraft altitude to an aim disparity value of zero, resulting in the contemporary two dimensional display. Additional user controls may allow air traffic controllers to toggle between the two dimensional display and the three dimensional display. A failure mode of the embodiments of the invention, such as the loss of 3D information, would result in the contemporary two dimensional display. Some embodiments may allow air traffic controllers to update aim disparity values for each aircraft based on a user input.

In addition to rendering the aircraft symbols on the display, text labels in the proximity of each aircraft may also be rendered such that the text label corresponding to each aircraft has the same disparity as the aircraft and thus would be viewed at the same vertical depth as the aircraft symbol. User preferences may be adjusted to allow the air traffic controller to present or remove a text label indicating the altitude of each aircraft, if FAA or governing agency guidance were to permit such display modifications for clutter management. Additionally these label options may be applied per aircraft or per sector.

As set out above, additional features and markings may be displayed along with the air traffic data. For example, coordinates and altitude of weather related phenomena may be converted to a disparity value and a depiction may then be rendered on the visual display to better show its proximity to aircraft maneuvering. Additionally, terrain features or obstructions having an altitude of 1,000 feet or more may also be converted to disparity values and rendered on the virtual display in some embodiments. In some embodiments, the outer boundaries of airspace maps may be rendered as a wire frame boundary on the visual display so that air traffic controllers can easily see aircraft entering and exiting the airspace.

Figure 13:
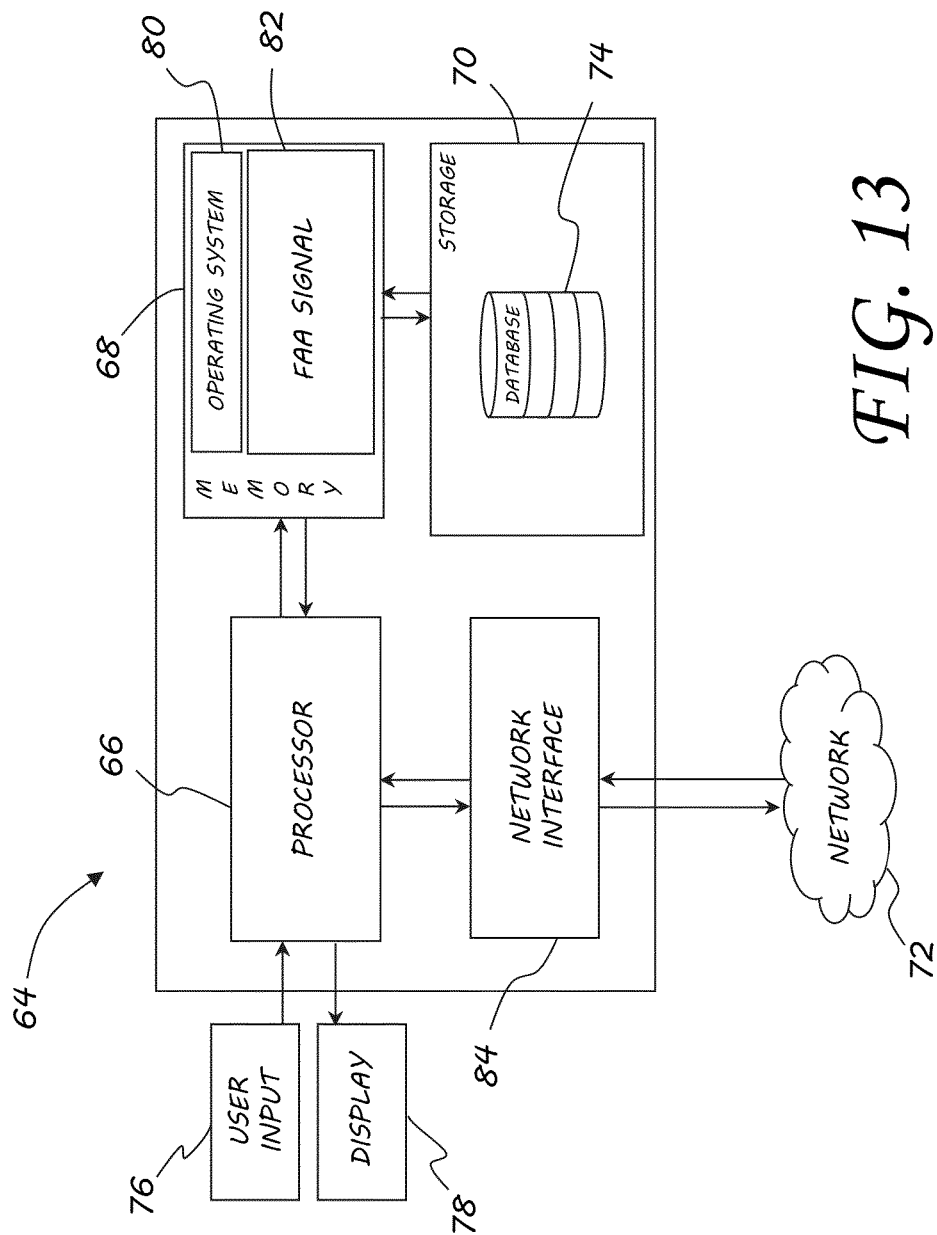
FIG. 13 is an exemplary hardware processing environment that may be used with any embodiments of the invention.

In some embodiments, an aim for future track for one or more of the aircraft may be determined and the altitude of the aim future track may be converted to an aim disparity value to render a graphical indicator of the aim future track on the top-down depiction of each aircraft within the airspace. Similar rendering may be performed for any updates to actual or future track for any of the aircraft, permitting the controller, to, for example, compare the commanded aircraft track with the actual track of the aircraft over time FIG. 13 illustrates an exemplary hardware and software environment for an apparatus 64 suitable for generating three dimensional images in a manner consistent with the invention (such as processors 50, 52, and 60 in FIG. 12). For the purposes of the invention, apparatus 64 may represent practically any computer, computer system, or programmable device, e.g., multi-user or single-user computers, desktop computers, portable computers and devices, handheld devices, network devices, mobile phones, etc. Apparatus 64 will hereinafter be referred to as a "computer" although it should be appreciated that the term "apparatus" may also include other suitable programmable electronic devices.

Computer 64 typically includes at least one processor 66 coupled to a memory 68. Processor 66 may represent one or more processors (e.g. microprocessors), and memory 68 may represent random access memory (RAM) devices comprising the main storage of computer 64, as well as any supplemental levels of memory, e.g., cache memories, non-volatile or backup memories (e.g. programmable or flash memories), read-only memories, etc. In addition, memory 68 may be considered to include memory storage physically located elsewhere in computer 64, e.g., any cache memory in a processor 66, as well as any storage capacity used as a virtual memory, e.g., as stored on a mass storage device 70 or another computer coupled to computer 64 via a network 72. The mass storage device 70 may contain a cache or other dataspace which may include database 74. Database 74 may contain saved air traffic data 46 that may be used in simulations for training.

Computer 64 also typically receives a number of inputs and outputs for communicating information externally. For interface with a user or operator, computer 64 typically includes one or more user input devices 76 (e.g., a keyboard, a mouse, a trackball, a joystick, a touchpad, a keypad, a stylus, and/or a microphone, among others). Computer 64 may also include a display 78 (e.g., a stereoscopic monitor, a CRT monitor, an LCD display panel, and/or a speaker, among others). The interface to computer 64 may also be through an external terminal connected directly or remotely to computer 64, or through another computer communicating with computer 64 via a network 72, modem, or other type of communications device.

Computer 64 operates under the control of an operating system 80, and executes or otherwise relies upon various computer software applications, components, programs, objects, modules, data structures, etc. (e.g. FAA SIGNAL Software 82). The SIGNAL software 82, for example, may be used to generate images from real time radar data or generate images from air traffic data stored in database 74. Computer 64 communicates on the network 72 through a network interface 84.

In general, the routines executed to implement the embodiments of the invention, whether implemented as part of an operating system or a specific application, component, program, object, module or sequence of instructions will be referred to herein as "computer program code", or simply "program code". The computer program code typically comprises one or more instructions that are resident at various times in various memory and storage devices in a computer, and that, when read and executed by one or more processors in a computer, causes that computer to perform the steps necessary to execute steps or elements embodying the various aspects of the invention. Moreover, while the invention has been described in the context of fully functioning computers and computer systems, those skilled in the art will appreciate that the various embodiments of the invention are capable of being distributed as a program product in a variety of forms, and that the invention applies equally regardless of the particular type of computer readable media used to actually carry out the distribution. Examples of computer readable media include but are not limited to physical, recordable type media such as volatile and non-volatile memory devices, floppy and other removable disks, hard disk drives, optical disks (e.g., CD-ROM's, DVD's, etc.), among others, and transmission type media such as digital and analog communication links.

In addition, various program code described hereinafter may be identified based upon the application or software component within which it is implemented in specific embodiments of the invention. However, it should be appreciated that any particular program nomenclature used is merely for convenience, and thus the invention should not be limited to use solely in any specific application identified and/or implied by such nomenclature. Furthermore, given the typically endless number of manners in which computer programs may be organized into routines, procedures, methods, modules, objects, and the like, as well as the various manners in which program functionality may be allocated among various software layers that are resident within a typical computer (e.g., operating systems, libraries, APIs, applications, applets, etc.), it should be appreciated that the invention is not limited to the specific organization and allocation of program functionality described herein.

Those skilled in the art will recognize that the exemplary environment illustrated in FIG. 13 is not intended to limit the present invention. Indeed, those skilled in the art will recognize that other alternative hardware and/or software environments may be used without departing from the scope of the invention.

Figure 14A:
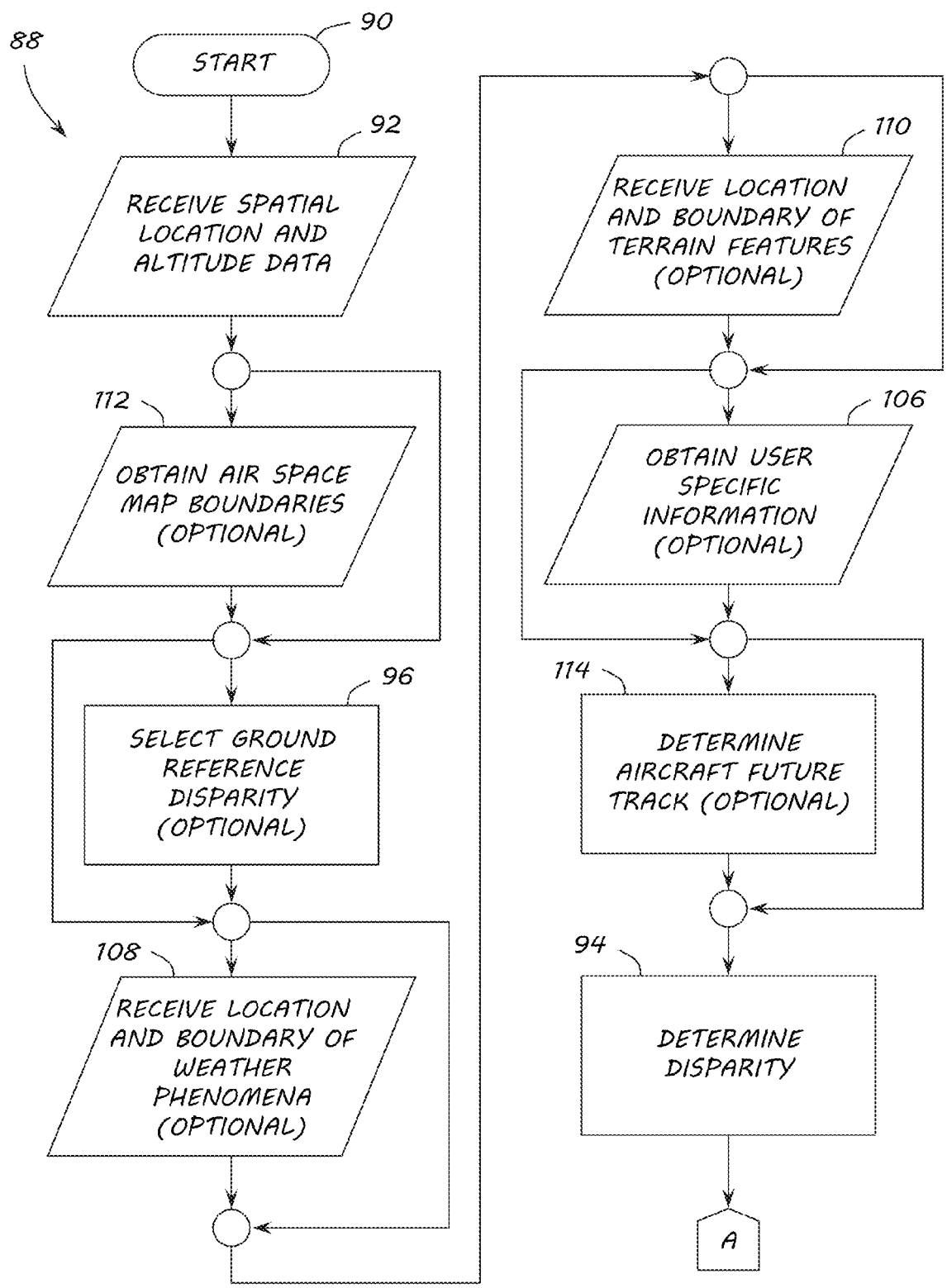
FIGS. 14A and 14B contain a flowchart illustrating the method consistent with embodiments of the invention.
Figure 14B:
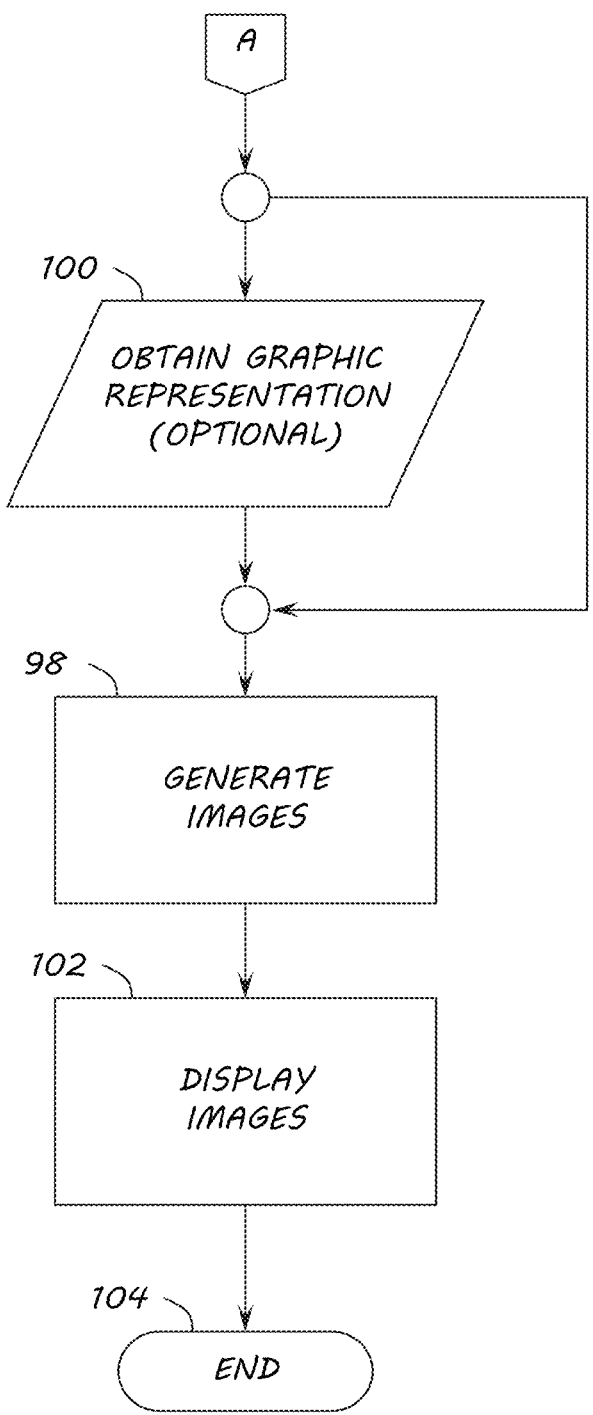

A method employed by embodiments of the invention is illustrated in flowchart 88 in FIGS. 14A and 14B. As shown, at the start of the method at block 90, the system receives air traffic data at block 92, which may include a two dimensional spatial location indicating a location of the aircraft with respect to an airport and an altitude of the aircraft. The system may then determine a disparity value at block 94 based on the altitude for each aircraft in the received air traffic data. This step may optionally include selecting at block 96 or inferring a ground reference disparity and then calculating a change in disparity as a function of the aircraft altitude. For example, a ratio of the aircraft altitude to a maximum possible aircraft altitude (e.g., 40,000 feet) may be determined and this ratio may be multiplied by the difference between the disparity of the ground reference plane and a maximum desired disparity (e.g., 3 degrees of visual angle). This disparity value may then be converted to a pixel offset by assuming a viewing distance to the display (e.g., 3 picture heights).

These pixel offset values may then be used to generate images at block 98 by optionally obtaining a graphic of an aircraft at block 100 and determining the location of the aircraft on the ground reference plane based upon the spatial location of the aircraft. Then the offset position of the graphic may be determined for the left and right eye images in the horizontal plane by a distance equal to half of the pixel offset. Additional eye views may also be generated, in some embodiments, if the three-dimensional display supports more than two eye views. Optionally, the system may obtain two separate graphics of the aircraft, which provide the appropriate parallax and render these separate graphics onto the appropriate left and right eye views. The system may then display the images at block 102 to left and right eyes of an observer. The method completes and a cycle of rendering of images ends at block 104. It is recognized, however, that the aircraft will change location over time and that this process will need to be completed for each aircraft repetitively over time.

In some embodiments, obtaining a graphic representation (block 100) may also include obtaining a graphic representation of the ground plane. This graphic representation may include, for example, a series of range rings 20. In these embodiments, the system may further include determining a disparity value at block 96 for the ground reference plane and the generating of images at block 98 may include rendering a graphic representation of the ground plane with the selected disparity value into each of the images. Although a graphic of the ground reference plane may be shown with a disparity that will place it at many altitudes, many of the embodiments determine the disparity value for each aircraft to be greater (e.g., of a larger positive magnitude) than the disparity value of the ground reference.

Further in some embodiments, obtaining a graphic representation (block 100) may further include obtaining text and the generating of images at block 98 may further include generating a left and a right eye image of the text corresponding to all or a portion of the air traffic data for each aircraft. In a specific embodiment, generating the images at block 98 includes rendering the text into the left and right eye images with the same disparity of the aircraft to which the text corresponds. The disparity value for the text is then determined from the altitude of the corresponding aircraft.

In some embodiments, the method may further involve obtaining user specific information at block 106. This user specific information may include, for example, a range of disparities that any particular user may fuse on the three-dimensional display or it may include disparities corresponding to a user's preferred location of the ground plane and a maximum aircraft altitude. It might also include a user desired map between altitude and disparity, permitting for example, larger disparity differences to be present for low altitude aircraft than high altitude aircraft or vice versa. In these embodiments, these values may then be used to select the ground reference disparity at block 96 and to determine the disparity of the aircraft at block 94.

In additional embodiments, the system may receive a location, altitude, and a three dimensional boundary of weather phenomena at block 108, such as high turbulence zones or heavy rain. This boundary may be represented by a set of coordinates or it may simply include a point cloud of radar returns. In these embodiments, the disparity may be determined for the boundary or points of the weather phenomena. A graphical representation corresponding to the type of weather phenomena may be obtained at block 100 and a boundary of the weather phenomena then be generated in the images at block 98 with points on the boundary or within the point cloud having disparities, which correspond to an altitude of the weather phenomena. A disparity value for generating a left and a right eye image at block 98 of the weather related phenomena will be determined and the left and right eye image of the weather related phenomena will be displayed at block 102 to the air traffic controller on a three-dimensional display.

In still other embodiments, the system may receive location, altitude and boundaries of terrain features at block 110. These boundaries may be represented by a set of coordinates or may simply include a point cloud of radar returns. In these embodiments, a disparity may be determined for the boundary or points of the terrain features. A graphical representation corresponding to the type of terrain feature may be obtained in block 100 and the boundary of the weather phenomena will be generated in the images at block 98 with points on the boundary or within the point cloud having disparities which correspond to the altitude of the portions of the terrain feature. A disparity value for generating a left and right eye image at block 98 of the terrain features will be determined and the left and right eye image of the terrain feature will be displayed at block 102 to the air traffic controller on a three-dimensional display.

In yet further embodiments, the system may obtain air space map boundaries at block 112. A disparity may be determined at block 94 for points along the boundary based upon their altitude and an appropriate graphical representation may be obtained at block 100 and rendered within the left and right eye images with the appropriate disparity to generate images at block 98 within the current method.

The future track of an aircraft may optionally be displayed on contemporary ATC systems based either upon the current velocity and acceleration of the aircraft or based upon commands issued by an air traffic controller for the aircraft to execute, or some combination of these inputs. Such a future track can aid the air traffic controller to project the future, aiding their ability to predict potential conflicts. Some embodiments of the invention may also include the ability to display future track for one or more aircraft. The future track for one or more of the aircraft within the airspace may be determined at block 114. A disparity of each point along the future track may be determined at block 94 according to the altitude of points along the future track, a graphic representation of the future track may be obtained at block 100 and images containing the graphical may be generated at block 98 and displayed at block 102. Some of these embodiments may also include determining an updated future track at block 114 for one or more of the aircraft.

Other uses for embodiments of the invention may be for air traffic control training environments where trainees become accustomed to taking a two dimension display and converting it into a three dimensional image. Embodiments may be used in congested airspace where a dispatcher or other non-controller may need to monitor airspace for certain aircraft, such as a commercial delivery service dispatcher monitoring/tracking their own aircraft's routes. This would prove especially useful for those tracking flights that do not possess the require skills in determining spatial orientation base on the altitude codes. Embodiments may be used in national defense applications where ever larger numbers of unmanned aerial vehicles (UAVs) or remotely piloted aircraft (RPAs) operate to assist an operator or controller in determining aircraft spatial orientation in a congested battle space or area of responsibility such as Iraq during the war. For those ATC positions that do not necessarily operate directly in front of a single scope, but rather walk behind many acting as a coordinator over all airspace in a sector—embodiments of the invention may allow them to see altitudes of aircraft related to each other and the surface without having to get close enough to the screen to read the three digit altitude codes making monitoring several positions at once simpler and less mentally tasking while improving efficiency.

Another alternative is to employ a type of stereo display that does not require active shutter glasses such as circular polarized lenses that do not need to be synched up to the video, or a display that does not require any peripheral headgear at all. Such new display technology is available commercially in small sized screens such as handheld gaming device and mobile phones. This technology would be a good alternative as the passive non-glasses display technology matures.

While the present invention has been illustrated by a description of one or more embodiments thereof and while these embodiments have been described in considerable detail, they are not intended to restrict or in any way limit the scope of the appended claims to such detail. Additional advantages and modifications will readily appear to those skilled in the art. The invention in its broader aspects is therefore not limited to the specific details, representative apparatus and method, and illustrative examples shown and described. Accordingly, departures may be made from such details without departing from the scope of the general inventive concept.

What is claimed is:

1. A method of presenting air traffic data to an air traffic controller, the method comprising:
   receiving air traffic data including a two dimensional spatial location and altitude for a plurality of aircraft;
   determining a binocular disparity value based on the altitude for each aircraft of the plurality of aircraft;
   generating a left and a right eye image of the plurality of aircraft where at least one of the left and right eye image is based on the determined binocular disparity value; and
   simultaneously displaying the left and right eye images to the air traffic controller on a display,
   wherein the simultaneously displayed images provide an apparent three-dimensional separation of each of the aircraft of the plurality of aircraft on the display.

2. The method of claim 1, further comprising:
   rendering a representation of a reference plane on the display.

3. The method of claim 2, wherein the left and right eye image of the plurality of aircraft are generated as a perspective view with respect to the reference plane.

4. The method of claim 2, wherein the reference plane is rendered including range rings.

5. The method of claim 2, wherein the reference plane is rendered with a near zero binocular disparity.

6. The method of claim 2, wherein the apparent three-dimensional separation of each of the aircraft of the plurality of aircraft on the display appears above the reference plane.

7. The method of claim 1, wherein the air traffic data includes a representation of a volume of air space under control, the method further comprising:
   determining a binocular disparity value associated with the representation of the volume of air space under control;
   generating a left and a right eye image of the representation of the volume of air space under control where at least one of the left and right eye image is based on the determined binocular disparity value; and
   simultaneously displaying the left and right eye images to the air traffic controller on the display.

8. The method of claim 1, wherein the air traffic data includes navigation cues selected from a group consisting of: weather related phenomena, terrain obstructions, topographical data, minimum safe altitudes, and minimum vectoring altitude, the method further comprising:
   determining a binocular disparity value associated with the navigation cues;

generating a left and a right eye image of the navigation cues where at least one of the left and right eye image is based on the determined binocular disparity value; and simultaneously displaying the left and right eye images of the navigation cues to the air traffic controller on the display.

9. The method of claim 1, further comprising:

generating a left eye and a right eye image of a text label for each of the aircraft of the plurality of aircraft based on the determined binocular disparity; and simultaneously displaying the left and right eye images of the text label for each of the aircraft of the plurality of aircraft to the air traffic controller on the display.

10. The method of claim 1, wherein the binocular disparity value is between −6 and 6 degrees.

11. The method of claim 1, wherein the binocular disparity value includes at least 40 discrete levels.

12. The method of claim 1, wherein the binocular disparity value is set to zero in response to a loss of three dimensional information in the air traffic data.

13. An apparatus for presenting air traffic data to an air traffic controller, the apparatus comprising:

a memory;

a processor;

a display; and program code resident in the memory and configured to be executed by the processor to present the air traffic data to the air traffic controller, the program code further configured to receive air traffic data including a two dimensional spatial location and altitude for a plurality of aircraft, determine a binocular disparity value based on the altitude for each aircraft of the plurality of aircraft, generate a left and a right eye image of the plurality of aircraft where at least one of the left and right eye image is based on the determined binocular disparity value, and simultaneously display the left and right eye images to the air traffic controller on the display, wherein the simultaneously displayed images provide an apparent three-dimensional separation of each of the aircraft of the plurality of aircraft on the display.

14. The apparatus of claim 13, further comprising:

a pair of polarizing filters oriented differently with respect to one another, wherein the left eye image is polarized similar to one of the pair of polarizing filters, and wherein the right eye image is polarized similar to the other of the pair of polarizing filters.

15. The apparatus of claim 14, wherein the polarizing filters comprise linear polarization.

16. The apparatus of claim 14, wherein the polarizing filters comprise circular polarization.

17. The apparatus of claim 13, further comprising:

a pair of shutters configured to block light, wherein display of the left eye image is synchronized with one of the pair of shutters, and wherein display of the right eye image is synchronized with the other of the pair of shutters.

18. The apparatus of claim 13, wherein the display is a stereoscopic display.

19. An apparatus for presenting air traffic data to an air traffic controller, the apparatus comprising:

a first memory associated with a first processor;

a second memory associated with a second processor;

a third memory associated with a third processor;

a display;

a first program code resident in the first memory and configured to be executed by the first processor, the first program code is further configured to receive air traffic data including a two dimensional spatial location and altitude for a plurality of aircraft, determine a binocular disparity value based on the altitude for each aircraft of the plurality of aircraft, and generate a left eye image of the plurality of aircraft;

a second program code resident in the second memory and configured to be executed by the second processor, the second portion of the program code is further configured to simultaneously receive the air traffic data including the two dimensional spatial location and altitude for the plurality of aircraft, determine the binocular disparity value based on the altitude for each aircraft of the plurality of aircraft, and generate a right eye image of the plurality of aircraft; and a third program code resident in the third memory and configured to be executed by the third processor, the third program code is further configured to receive the left and the right eye image of the plurality of aircraft and simultaneously display the left and right eye images to the air traffic controller on the display, wherein at least one of the left and right eye image is based on the determined binocular disparity value, and wherein the simultaneously displayed images provide an apparent three-dimensional separation of each of the aircraft of the plurality of aircraft on the display.

20. The apparatus of claim 19, wherein the display is a stereoscopic display.

* * * * *